A. L. STANFORD.
METHOD OF FORMING LOCKING SCREW THREADS.
APPLICATION FILED JAN. 24, 1920.

1,367,168.

Patented Feb. 1, 1921.

Witness:
Harry S. Gaither

Inventor,
Arthur L. Stanford
By Banning & Banning
Attys.

UNITED STATES PATENT OFFICE.

ARTHUR L. STANFORD, OF CHICAGO, ILLINOIS.

METHOD OF FORMING LOCKING SCREW-THREADS.

1,367,168.	Specification of Letters Patent.	Patented Feb. 1, 1921.

Application filed January 24, 1920. Serial No. 353,792.

*To all whom it may concern:*

Be it known that I, ARTHUR L. STANFORD, a citizen of the United States, residing at Chicago, in the county of Cook and State of Illinois, have invented certain new and useful Improvements in Methods of Forming Locking Screw-Threads, of which the following is a specification.

This invention is directed primarily to the formation of screw threads on a nut locking bolt, although the principles here involved are applicable to the formation of the threads on the nut, since the invention resides in the formation of the threads themselves without especial regard to the identity of the element which carries the threads.

In the art to which the present invention pertains it is known that a successful nut lock must possess certain characteristics in order to adapt it for use under ordinary working conditions on railroads or the like. Thus the locking engagement of the threads must be effected by means which will not tend to impair the strength of the nut or bolt as the case may be, or to reduce the contact area of the threads with one another. The lock must be of a character which will enable the parts to be united by means of ordinary tools in the hands of unskilled workmen. The locking engagement must be such as to practically exclude the ingress of moisture which would tend to occasion rust on the interior of the interlock, and the locking impingement should be of a character which obviates the imposition of pressure in a direction tending to unthread the nut from the bolt. The nut and bolt in their general formation and configuration should conform to recognized standards of size, pitch, and thread formation, and the devices should be of a character such that they may be produced cheaply and by methods which do not differ materially from those commonly employed in the production of nuts and bolts. The device and method of the present invention conform to the above requirements, and the nut or bolt of the present invention may be produced by the application of the present method to staple products of standard make.

In practising the method of the present invention, as applied to bolts, a bolt of ordinary standard formation having threads of uniform width, depth, and pitch is preferably heated to a red heat to increase the compressibility of the metal, after which the head and shank of the bolt are dipped into water to cool and harden this portion of the bolt, and the tip end of the bolt is likewise cooled and hardened to preserve the initial width, depth and pitch of the end threads, after which the bolt is subjected to endwise compression in a press or by suitable tools and appliances. With the ends of the bolt thus cooled, the compressive action will be centered or localized in the heated portion of the bolt, with the result that the threads on this portion of the bolt will be compressed to the desired degree, thereby tending to reduce the width of the threads and at the same time extend the apexes of the threads beyond the line representing the normal outer diameter of the bolt. Some reduction in the pitch of the threads will also be effected by the compressive action, and this distortion of the threads from normal will to some extent be progressive, the distortion increasing progressively inward, due to the maintenance of a progressively greater degree of heat at those points which are most distant from the tip and shank ends of the bolt which have been subjected to the cooling influence of emersion in water or the like.

It is evident that by a proper localizing of the cooling influence, the threads of a bolt, thus subjected to endwise compression, can be progressively compressed and distorted from normal, so that a normal nut having complementary engagement with the bolt will be progressively gripped and tightened when threaded onto the bolt, thereby affording an easy entrance and finger fit for the nut at the tip end of the bolt, with a progressive tightening as the nut is screwed to place.

Figure 1:
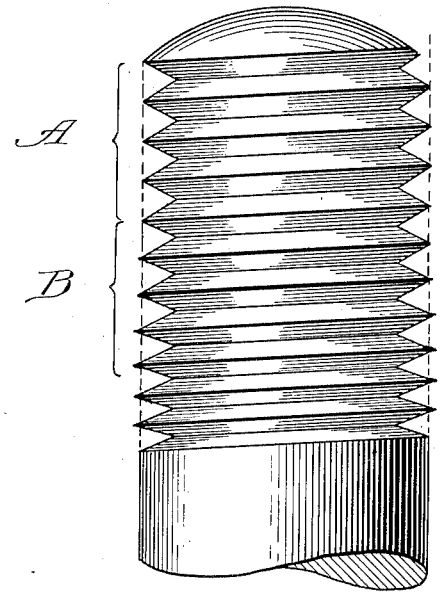
Figure 1 is a side elevation of a bolt conforming to the present invention.

Fig. 1 illustrates a bolt conforming to the formation above described, in which A indicates the initial inch of the bolt in which the threads maintain their normal character, and B the second inch, in which the distortion due to the localizing of the heat at this point, is progressively maintained, and within which limits such distortion is substantially centered. Of course, the localizing of the distorted threads and the extent of their distortion will be dependent upon the manner and duration of application of the cooling influence and the degree and manner of imposing the endwise compression upon the bolt.

Figure 2:
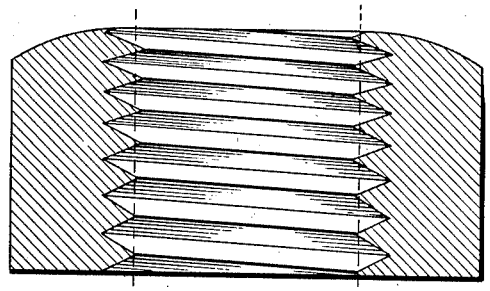
Fig. 2 is a sectional elevation of a nut conforming to the present invention.

Since a bolt and a nut are complementary elements, a distortion of the nut threads, by the method and in the manner heretofore defined, will effect a similar result when the nut is applied to a complementary bolt of standard uniform thread. Fig. 2 shows a nut in which the outermost threads have been distorted and compressed, leaving the inner or initial threads uncompressed to afford an easy application and finger fit of the nut to the intended bolt.

The thread interlock afforded by threads distorted in the manner and by the method outlined is superior to an interlock afforded by threads which are distorted or thrown out of normal on one side only of the threading, in that a complete circumferential enlargement of the threaded surfaces is effected in gripping contact, so that no undue or excessive strains are imposed upon fractional portions of the threaded surfaces and the completeness of the interlock between nut and bolt is maintained throughout, which is not the case in various prior constructions in which a thread is distorted unequally at one or more points in a complete convolution. Furthermore, the progressive distension of the threads, due to the method here employed, permits an easy application of the nut and a progressive tightening thereof without the obtrusion of any sudden or abrupt obstacles to the tightening of the nut, which proceeds by progressive degrees until the ultimate interlock has been attained. Furthermore, the method employed is one which in no way reduces the strength of the bolt or nut by a cutting away or reduction in the mass of metal utilized, but on the contrary tends to increase the effective diameter of the bolt at the interlocking point, with the result that the engagement between the nut and bolt will be close and uninterrupted, so that moisture will be excluded and the life of the united nut and bolt preserved. At the same time, despite the tightness of the fit, the nuts can be readily removed by a reverse application of the same power required in threading the nuts to place, and this circumstance, together with the exclusion of rust influences, is a factor of importance, particularly in the case of nuts and bolts intended for railroad use.

I claim:

1. The method of forming interlocking threads, which consists in heating the threaded article, then subjecting the article to a cooling influence at one end of the threaded area to unequally reduce its compressibility, and then subjecting the article to endwise compression to unequally compress the threads, substantially as described.

2. The method of forming interlocking threads, which consists in heating the threaded article, then subjecting the article to a cooling influence at one end of the threaded area to unequally reduce its compressibility, and then subjecting the article to endwise compression to progressively compress the threads, substantially as described.

ARTHUR L. STANFORD.